United States Patent
Walko, III (10) Patent No.: US 10,436,090 B2
(45) Date of Patent: Oct. 8, 2019

(54) SOOT SEPARATOR FOR AN INTERNAL COMBUSTION ENGINE

(71) Applicant: Clean Diesel Development LLC, Saxonburg, PA (US)

(72) Inventor: John F. Walko, III, Trafford, PA (US)

(73) Assignee: Clean Diesel Development LLC, Saxonburg, PA (US)

( * ) Notice: Subject to any disclaimer, the term of this patent is extended or adjusted under 35 U.S.C. 154(b) by 155 days.

(21) Appl. No.: 15/466,652

(22) Filed: Mar. 22, 2017

(65) Prior Publication Data

US 2018/0274414 A1    Sep. 27, 2018

(51) Int. Cl.
| | |
|---|---|
| *F01N 3/037* | (2006.01) |
| *F02M 35/10* | (2006.01) |
| *F02M 26/35* | (2016.01) |

(52) U.S. Cl.
CPC ............. *F01N 3/037* (2013.01); *F02M 26/35* (2016.02); *F02M 35/10209* (2013.01); *F02M 35/10222* (2013.01); *F01N 2450/16* (2013.01); *F01N 2470/18* (2013.01); *Y02T 10/20* (2013.01)

(58) Field of Classification Search
CPC ...... F01N 13/10; F01N 3/037; F01N 2450/16; F01N 2470/18; F02M 35/10209; Y02T 10/20
USPC ............................................ 60/289, 297, 311
See application file for complete search history.

(56) References Cited

U.S. PATENT DOCUMENTS

| | | | |
|---|---|---|---|
| 3,056,662 A | 10/1962 | Ridgway | |
| 3,130,157 A | 4/1964 | Kelsall et al. | |
| 3,391,787 A | 7/1968 | Salomon | |
| 3,564,843 A * | 2/1971 | Hirsch et al. | ........... F01N 3/037 55/337 |
| 3,815,337 A | 6/1974 | Lenane | |
| 3,969,096 A | 7/1976 | Richard | |
| 4,279,743 A | 7/1981 | Miller | |
| 4,406,119 A * | 9/1983 | Kamiya | .................... F01N 3/01 55/282 |
| 4,989,408 A | 2/1991 | Leonhard et al. | |
| 5,102,431 A | 4/1992 | Barry | |
| 6,598,584 B2 * | 7/2003 | Beck | ......................... F02B 1/12 123/299 |
| 6,896,720 B1 | 5/2005 | Arnold et al. | |
| 7,266,943 B2 | 9/2007 | Kammel | |
| 9,260,995 B2 | 2/2016 | Patchett et al. | |

* cited by examiner

*Primary Examiner* — Thai Ba Trieu
*Assistant Examiner* — Diem T Tran
(74) *Attorney, Agent, or Firm* — The Webb Law Firm (57) ABSTRACT

A soot separator utilizing a toroid portion to centrifugally separate soot particles from the exhaust gas of an internal combustion engine. Upon lesser or no flow of exhaust gas, gravity causes the retained particles to fall within the bottom of the separator. The soot separator further includes a baffle to deflect particles and further enhance soot removal. A method utilizing this soot separator and association with an internal combustion engine are also described herein.

20 Claims, 14 Drawing Sheets

SOOT SEPARATOR FOR AN INTERNAL COMBUSTION ENGINE

BACKGROUND OF THE INVENTION

Field of the Invention

This invention relates to a centrifugal separator for removing soot particles from exhaust gas of an internal combustion engine.

Description of Related Art

Exhaust gas produced from an internal combustion engine includes undesirable pollutants in the form of nitrogen oxide (NOx) and carbon monoxide (CO). In addition, the exhaust gas includes carbon particles, which are more prevalent in diesel engines. These particles, generally described herein as soot, have a size on the order of about 0.01 to 1.00 micron. Currently, exhaust gas recirculation (EGR) systems intentionally introduce exhaust gas into the air intake of the engine to reduce the amount of NOx produced in the combustion process. However, by doing so, the carbon particles are also introduced into the air intake, which not only causes reduced engine performance, but also negatively impacts electronic sensors that are used for controlling engine performance and pollution abatement equipment. It is desirable to reduce or eliminate these particles from the EGR gas prior to reintroduction into the air intake. Filtering systems exist to remove these objectionable particles from the exhaust gas. However, such systems are mechanical or require complex electronics, each of which is prone to failure over time. Other systems include particle filters which must be replaced frequently to avoid clogging.

Further aggravating the situation, control systems for pollution abatement equipment on commercial diesel trucks, for example, are programmed to reduce engine output when certain antipollution equipment is nonfunctional or functioning only at a minimally prescribed level. Since a significant portion of pollution abatement equipment is directed to removal of soot particles, a device is needed to provide such pollution abatement wherein the device is robust, effective, and has few or no movable parts.

SUMMARY OF THE INVENTION

A soot separator has an enclosed chamber with a longitudinal axis extending from a top to a bottom of the chamber, an upper portion with outlet conduit having an external outlet, a lower portion, and a toroid portion between the upper portion and the lower portion. The toroid portion has a central opening extending therethrough along the longitudinal axis, a curved cross section having a gap facing the lower portion, and an inlet conduit having an external inlet wherein the inlet conduit extends into the toroid portion. Exhaust gas with soot particles enters the external inlet and travels about the toroid portion, such that a significant portion of the soot particles are deposited upon the inner toroid portion wall. The remaining exhaust gas with soot particles exits through the gap, continues through the central opening and is discharged at the external outlet.

Additionally, a method of removing soot particles from the exhaust gas of an internal combustion engine having a soot separator comprised of an enclosed chamber. The enclosed chamber has a longitudinal axis extending from a top to a bottom of the chamber, an upper portion with an external outlet, a lower portion, and a toroid portion between the upper portion and the lower portion. The toroid portion has a central opening extending therethrough along the longitudinal axis and a curved cross section having a gap facing the lower portion and an external inlet extending into the toroid portion. The method is comprised of the steps of: 1) introducing the exhaust gas/soot particle mixture into the external inlet of the chamber; 2) directing flow of the exhaust gas/soot particle mixture tangentially within the toroid portion such that soot particles are centrifugally deposited against the wall of the toroid portion; and 3) reducing or ceasing the flow of the exhaust gas/soot particle mixture within the toroid portion such that the soot particles are no longer centrifugally deposited against the wall of the toroid portion and fall to the bottom of the chamber.

Furthermore, a soot separator assembly for use with an internal combustion engine, having an exhaust manifold and an air intake manifold is comprised of a soot separator having an enclosed chamber having a longitudinal axis extending from a top to a bottom of the chamber, an upper portion with an external outlet, a lower portion, and a toroid portion between the upper portion and the lower portion. The toroid portion has a central opening extending along the longitudinal axis, a curved cross section having a gap facing the lower portion, and an external inlet extending into the toroid portion. The external inlet of the chamber is connected to the exhaust manifold of the internal combustion engine, and the external outlet of the toroid is connected to the air intake manifold of the internal combustion engine.

BRIEF DESCRIPTION OF THE DRAWINGS

Some of the advantages and features of the preferred embodiments of the invention have been summarized hereinabove. These embodiments, along with other potential embodiments of the device and method, will become apparent to those skilled in the art when referencing the following drawings in conjunction with the detailed description as they relate to the figures.

DESCRIPTION OF THE INVENTION

For purposes of the description hereinafter, spacial orientation terms, if used, shall relate to the referenced embodiment as it is oriented in the accompanying drawings figure or otherwise described in the following detailed description. However, it is to be understood that the embodiments described hereinafter may assume many alternative variations and embodiments. It is also to be understood that the specific devices illustrated in the accompanying drawing figures and described herein are exemplary and should not be considered as limiting.

Figure 1:
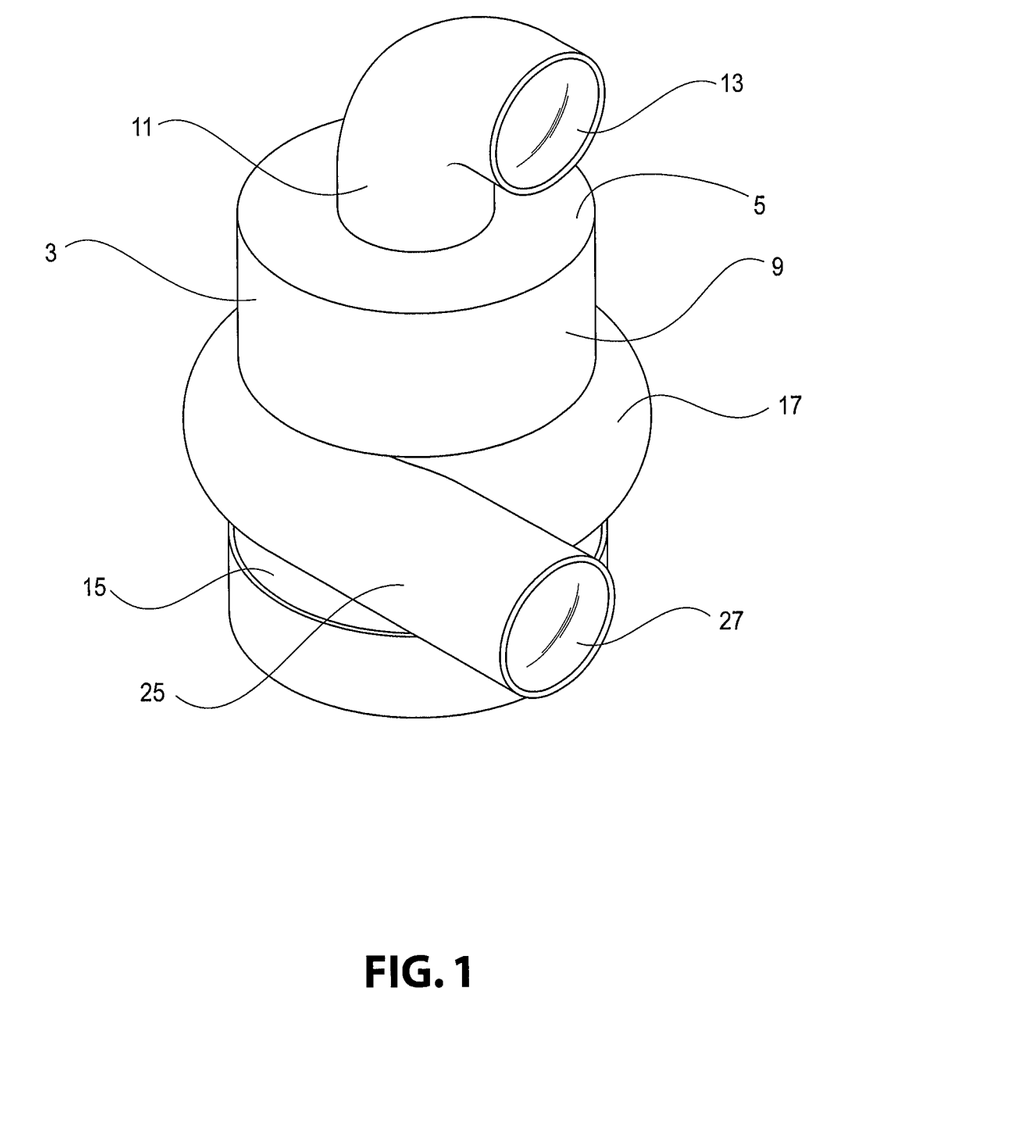
FIG. 1 is a perspective view of a soot separator in accordance with one embodiment of the subject invention.
Figure 2:
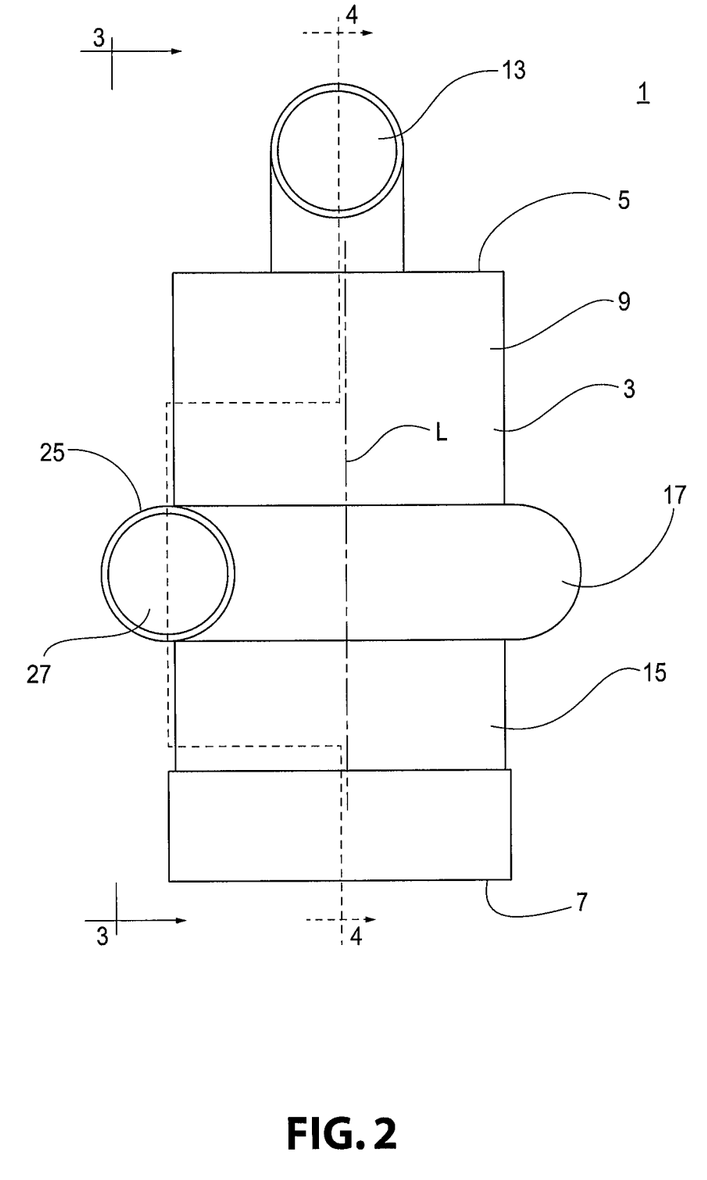
FIG. 2 is a front view of the separator illustrated in FIG. 1.
Figure 3:
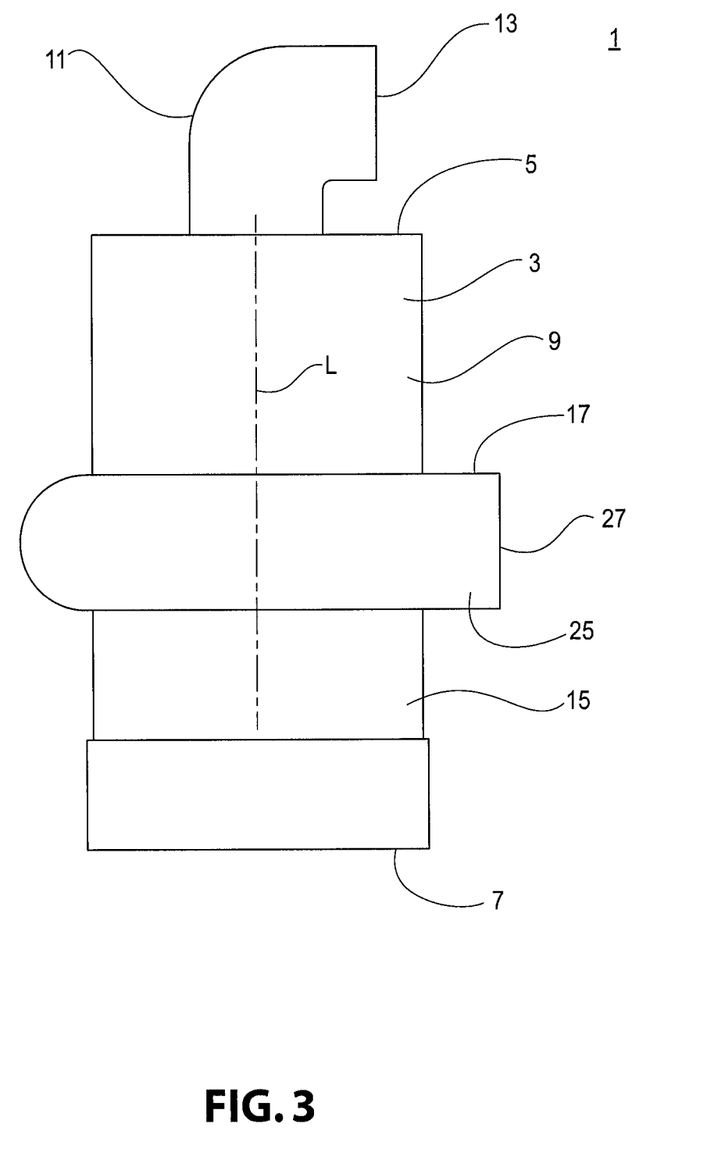
FIG. 3 is a side view of the separator along lines 3-3 in FIG. 2.

FIGS. 1-3 illustrate a perspective view, a front view, and a side view, respectively, of the exterior of one embodiment of a soot separator 1 in accordance with the subject invention. An enclosed chamber 3 has a longitudinal axis L extending from a top 5 to a bottom 7 of the chamber 3. An upper portion 9 of the chamber 3 has an outlet conduit 11 extending from the chamber 3 and the outlet conduit 11 having an external outlet 13. The chamber 3 has a lower portion 15 and a toroid portion 17 between the upper portion 9 and the lower portion 15.

As referred to herein, a toroid is a surface generated by a closed plane curve rotated about a line that lies in the same plane as the curve but does not intersect it. Sometimes this shape is referred to as a donut shape. However, as will be explained, the toroid described herein does not have a closed curve, but a portion of that curve is intentionally missing to provide a gap in a partially closed curve.

Figure 4:
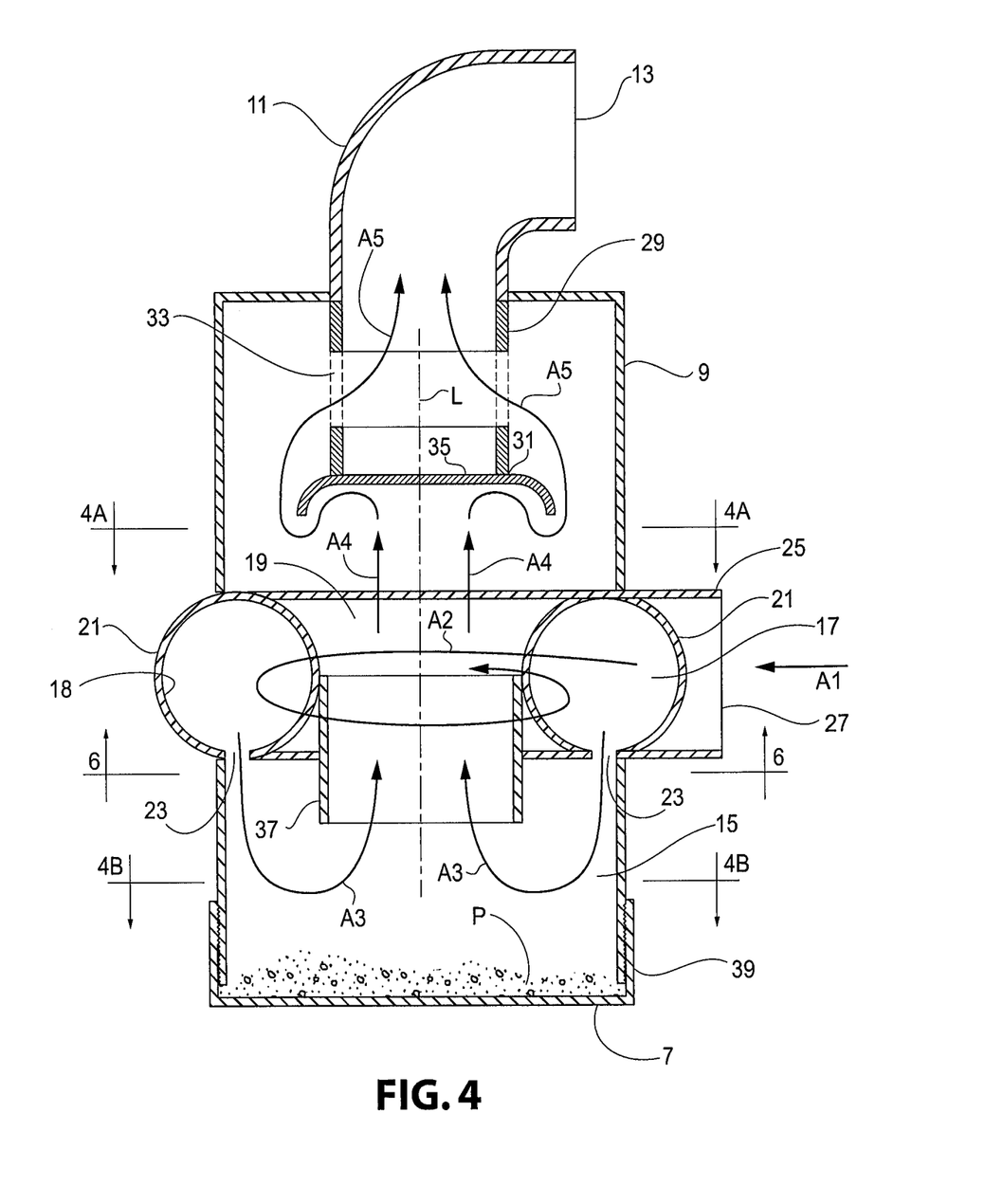
FIG. 4 is a cross-sectional view along lines 4-4 in FIG. 2.

Directing attention to FIG. 4, the toroid portion 17 has a central opening 19 extending along the longitudinal axis L. when viewed in a direction perpendicular to the longitudinal axis L, a cross section 21 of the toroid portion 17 is curved and has a gap 23 facing the lower portion 15. An inlet conduit 25 extends into the toroid portion 17 and has an external inlet 27. As illustrated in FIG. 4, in this embodiment the curved cross section 21 of the toroid portion is circular.

Figure 4A:
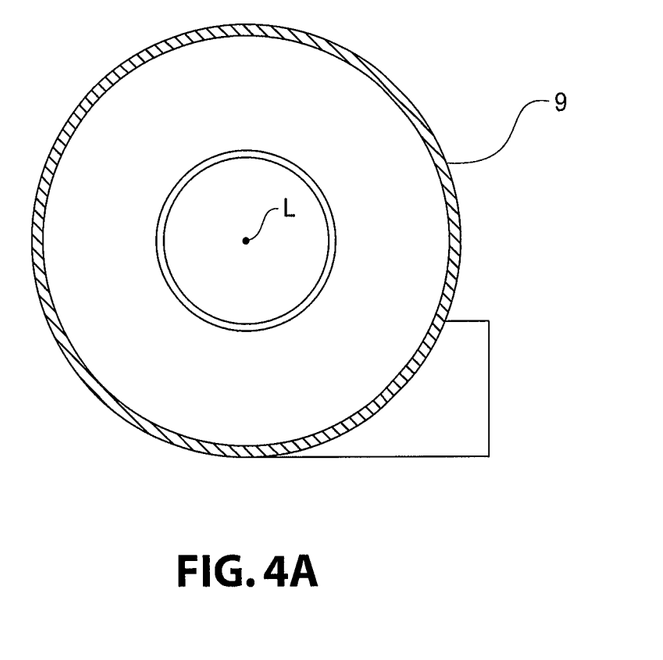
FIG. 4A is a cross-sectional view along lines 4A-4A in FIG. 4.
Figure 4B:
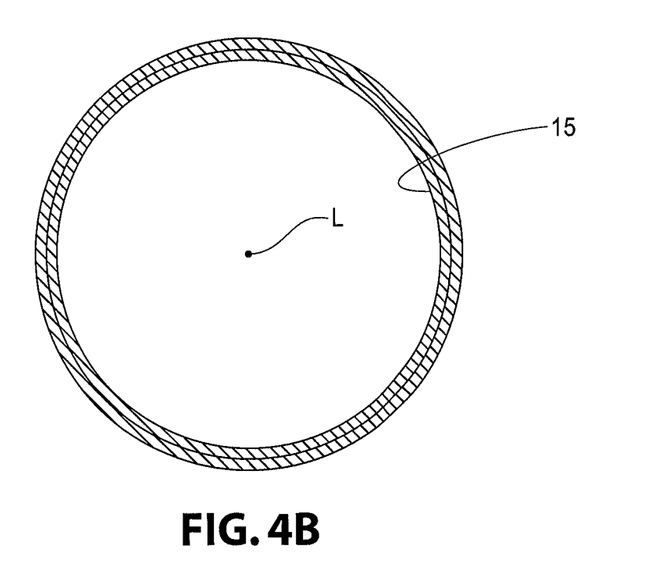
FIG. 4B is a cross-sectional view along lines 4B-4B in FIG. 4.

Furthermore, as illustrated in FIG. 4A, the upper portion 9 may be cylindrical while the lower portion 15, as illustrated in FIG. 4B, may also be cylindrical.

As illustrated in FIG. 4, the upper portion 9 may further include a discharge conduit 29 extending from the outlet conduit 11 into the chamber 3. The discharge conduit 29 may be sealed at a lower end 31 and may have lateral openings 33 that extend through the discharge conduit 29 between the sealed lower end 31 and the outlet conduit 11.

The discharge conduit 29 may be sealed with a concave-shaped element 35 wherein the concave shape faces the bottom 7 of the chamber 3. The discharge conduit 29 may also be sealed with a flat plate.

Figure 5:
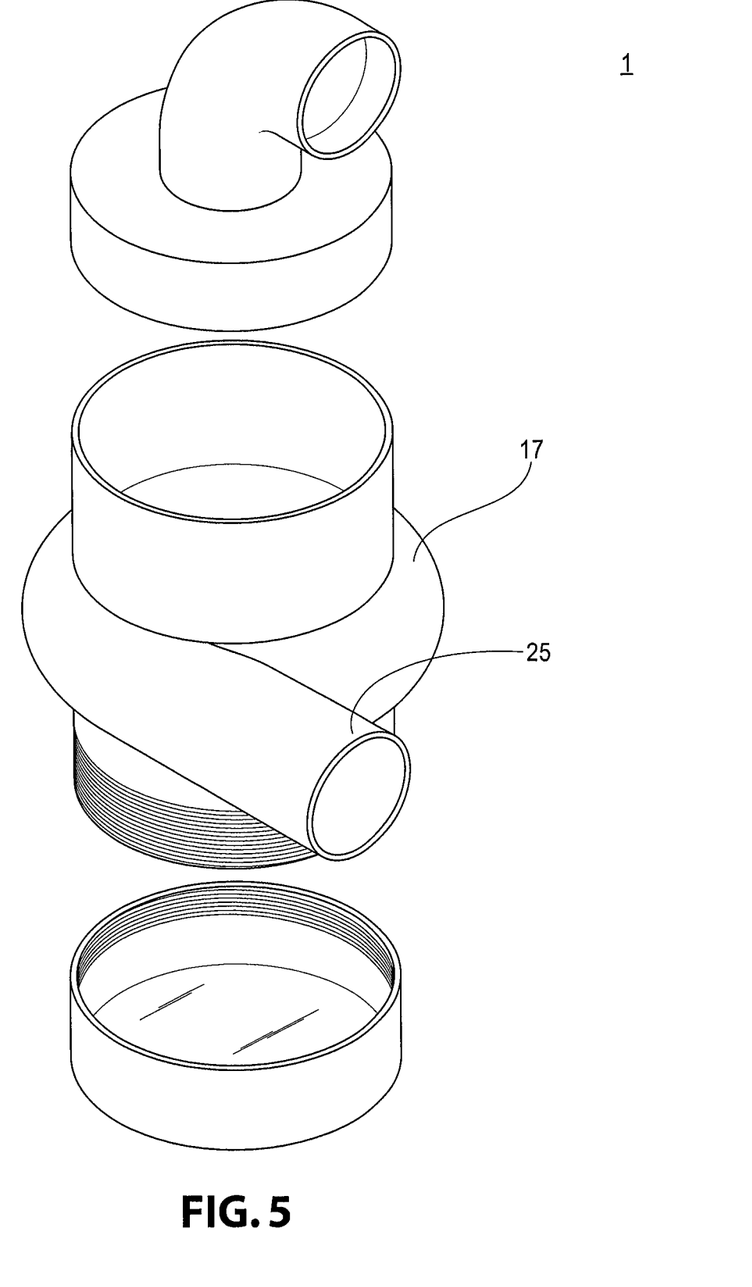
FIG. 5 is an exploded view of the separator illustrated in FIG. 1.
Figure 6:
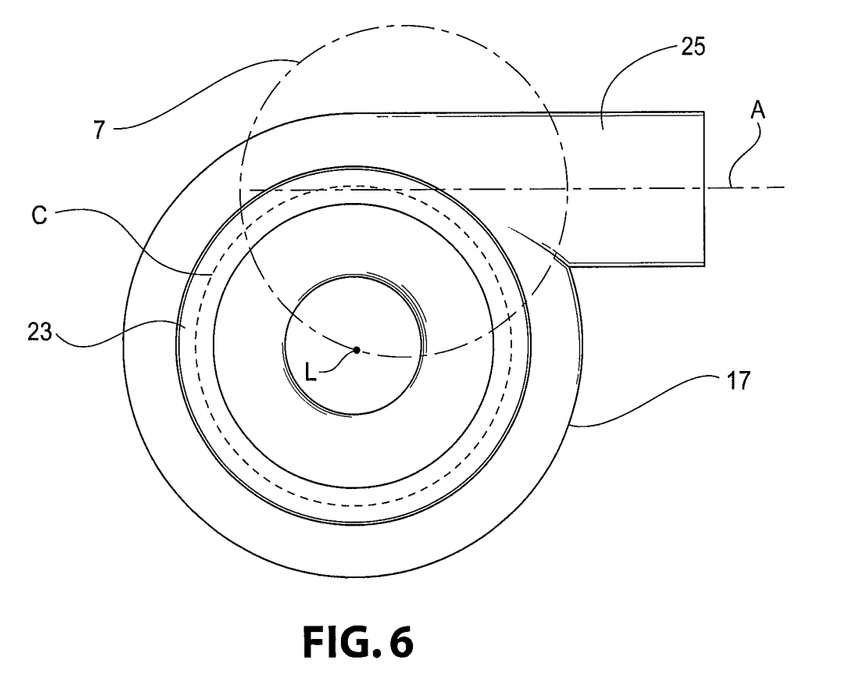
FIG. 6 is a detail of the separator taken along lines 6-6 in FIG. 4.

FIG. 5 shows an exploded view of the separator 1 and the relation of the inlet conduit 25 to the toroid portion 17. Furthermore, FIG. 6 is a view looking up along arrow 6-6 of FIG. 4 and is a view along the longitudinal axis L of the toroid portion 17. When viewed along the longitudinal axis L, the toroid portion 17 defines a circle C and the inlet conduit 25 has an axis A extending thorough the inlet conduit 25. The inlet conduit 25 connects to the toroid portion 17 such that the inlet conduit axis A is tangential to the circle C.

As further illustrated in FIG. 4, a pass-through conduit 37 may be attached to the central opening 19 of the toroid portion 17 and extends from the central opening 19 of the toroid portion 17 downward toward the bottom 7 of the chamber 3.

Exhaust gas under pressure with soot particles therein is introduced through the inlet conduit 25 to the inner wall 18 of the toroid portion 17. The gas/particle mixture is forced into the curved path of the toroid inner wall 18, wherein flow causes many of the particles, which are heavier than the exhaust gas, to impact upon the inner wall 18 of the toroid portion 17 where they are retained against the inner wall 18 of the toroid portion 17 by the flow of gas.

In operation, exhaust gas with soot particles is introduced under pressure to the external inlet 27, as indicated by arrow A1. The exhaust gas with the soot particles enters the toroid portion 17 as indicated by arrow A2 and travels about the interior of the toroid portion 17 such that soot particles hit and are deposited within the inner toroid portion wall 18. All of the air with the remaining soot particles exits through the gap 23, as indicated by arrow A3, and travels through the central opening 19 via the pass-through conduit 37, as indicated by arrows A4. Although the exhaust gas traveling as indicated by A4 could directly discharge at the external outlet 13, in one embodiment the exhaust gas and soot particles impinge upon the sealed lower end 31 of the outlet conduit 11, which as illustrated, may be sealed by a concave-shaped element 35. Soot particles that impact the concave-shaped element 35 may either be retained against the concave-shaped element 35 or drop downwardly through the central opening 19 to the bottom 7 of the chamber 3.

As indicated by arrow A5, the exhaust gas with fewer particles continues to travel through lateral openings 33 within the outlet conduit 11 where it is discharged through the external outlet 13. So long as significant flow continues into the external inlet 27 and out from the external outlet 13, the gas flow and the resultant centrifugal force tend to retain the particles against the inner wall 18 of the toroid portion 17.

However, when the exhaust gas flow is reduced or stopped from entering the external inlet 27, then particles that may have accumulated on the inner wall 18 of the toroid portion 17 or that may be retained within the concave-shaped element 35, are no longer retained. As a result, particles within the toroid portion 17 will fall by gravity through the gaps 23 and particles associated with the concave-shaped element 35 will fall by gravity through the central opening 19 to be deposited within the bottom 7 of the enclosed chamber 3. Particles P are shown in the bottom 7 of the chamber 3.

As shown in FIG. 4, a portion 39 of the bottom 7 of the chamber 3 is removable. In particular, in one embodiment the removable portion 39 is secured to the remainder of the lower portion 15 through a threaded connection 41. In this fashion, the removable portion 39, also referred to as the collection pot, may be removed from the remainder of the bottom portion 15 and the particles P collected therein may be discarded.

Figure 8:
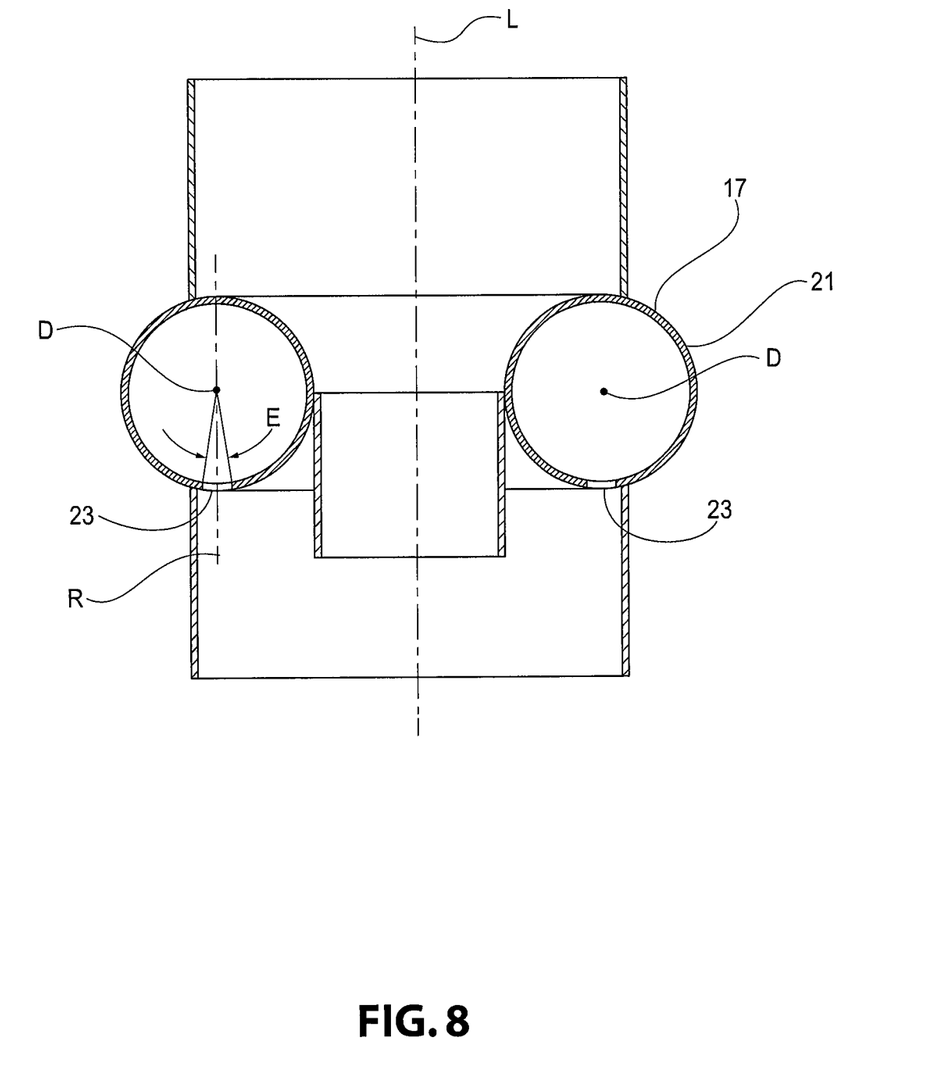
FIG. 8 is a cross-sectional view through the center of the middle portion illustrated in FIG. 5.

FIG. 8 illustrates a cross-sectional view of the toroid portion 17. Of particular interest, the toroid portion 17 has a central axis D extending thereabout. A gap 23, at the bottom of the toroid portion 17 spans an angle E of between 1 to 30° about the toroid portion curved cross section 21. As further indicated in FIG. 8, the angle E may be centered about a radial line R parallel to the longitudinal axis L.

Figure 7:
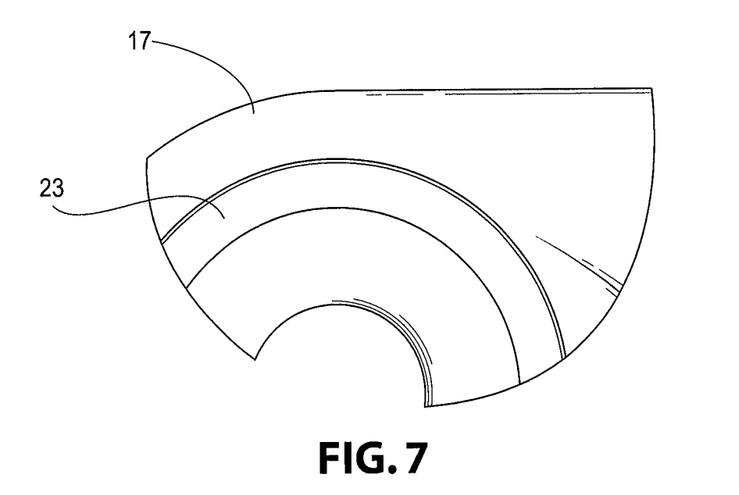
FIG. 7 is an enlarged view of the encircled portion of FIG. 6.

This gap 23 is further illustrated in the toroid portion underside view of FIG. 6 and the enlarged view of FIG. 7. It should be noted that the gap 23 is at the bottom of the toroid portion 17 so that the particles captured by the toroid portion 17 may fall by gravity through the gap 23.

Figure 9:
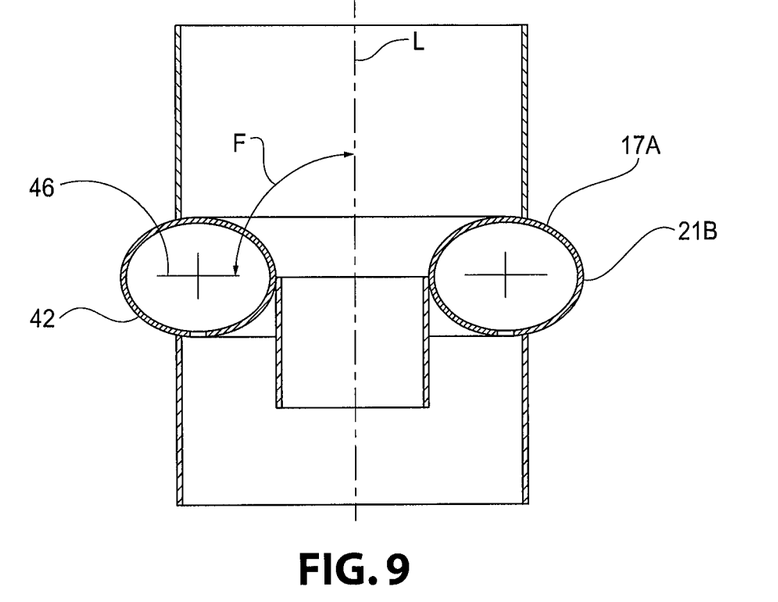
FIG. 9 is a cross-sectional view similar to FIG. 8, but illustrating a second embodiment.
Figure 10:
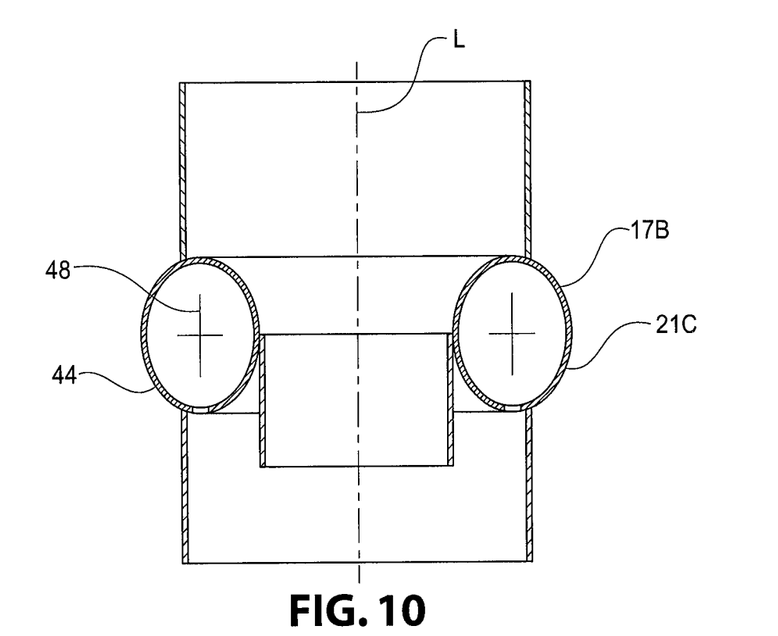
FIG. 10 is a cross-sectional view similar to FIG. 8, but illustrating a third embodiment.

So far discussed, toroid portion 17 has been defined as circular. As illustrated in FIG. 9, the curved cross-section 21A of a toroid portion 17A may have the shape of an ellipse 42 having a major axis 46 along a line forming an angle F with the longitudinal axis L of 90°. On the other hand, as illustrated in FIG. 10, the curved cross section 21B of a toroid portion 17B may have the shape of an ellipse 44 having a major axis 48 along a line forming an angle F with the longitudinal axis L of 0°. The ellipse may be oriented with the major axis anywhere between 0-90°.

The introduction of the concave-shaped element 35, within the flow path, increases the NOx reduction beyond that level attained with only the toroid portion 17.

Directing attention again to FIG. 4, the subject invention is also directed to a method of removing soot particles from the exhaust gas of an internal combustion engine having a soot separator. The soot separator has an enclosed chamber 3 with a longitudinal axis L extending from the top 5 to the bottom 7 of the chamber 3. The chamber 3 has an upper portion 9 with an external outlet 13 and a lower portion 15. A toroid portion 17 is between the upper portion 9 and the lower portion 15. The toroid portion 17 has a central opening 19 extending along the longitudinal axis L. The toroid portion 17, furthermore, has a curved cross section 21 with a gap 23 facing the lower portion 15. An inlet conduit 25 extends into the toroid portion 17 also has an external inlet 27 extending into the toroid portion 17. The method is comprised of the steps of introducing the exhaust gas/soot particle mixture into the external inlet 27 of the chamber 3. Thereafter, the flow is directed tangentially within the toroid portion 17 such that soot particles are centrifugally deposited against the inner wall 18 of the toroid portion 17. The exhaust gas and remaining soot particles are then directed from the toroid portion 17 through the outlet conduit 11 and out the external outlet 13.

The method is further comprised of reducing or ceasing the flow of the exhaust gas within the inlet conduit 25 and, therefore, within the toroid portion 17, such that the soot particles retained therein are no longer centrifugally deposited against the inner wall of the toroid portion 17 and fall by gravity through the gap 23 to the bottom 7 of the chamber 3.

The chamber 3 further includes a removable portion 39 at the bottom 7 of the chamber 3, and the method further includes the step of removing the removable portion 39 and discarding the soot particles P that have accumulated therein.

A discharge conduit 29 extends from the outlet conduit 11 into the chamber 3, wherein the discharge conduit 29 has a lower end 31 that is sealed with a concave-shaped element 35. The concave shape is directed toward the bottom 7 of the chamber 3. The discharge conduit 29 further includes lateral openings 33 extending therethrough between the sealed lower end 31 and the outlet conduit 11. The method further includes the step of directing the exhaust gas/soot particle mixture flow against the sealed lower end 31 such that additional soot particles are captured and fall to the bottom 7 of the chamber 3 when flow is reduced or ceases.

Figure 11:
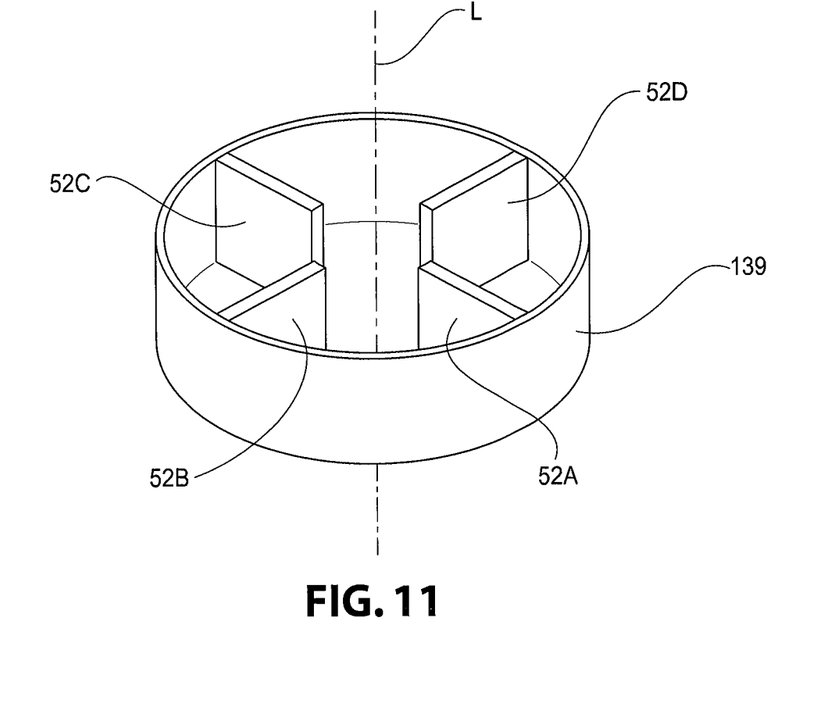
FIG. 11 is a perspective view of an alternative embodiment of the removable section.

The removable portion 39, so far discussed, has been solely for collecting particles for disposal. As illustrated in FIG. 11, one or more baffles 52A-52D may be introduced within the removable portion 139 to disrupt the rotational flow of particles that travel near the removable portion such that they drop into and remain within the removable portion 139. As illustrated, the baffles 52A-52D are radially mounted about the longitudinal axis L. Although not shown, it should be appreciated that the removable portion 139 may also have a threaded connection with the remainder of the chamber body.

Figure 12:
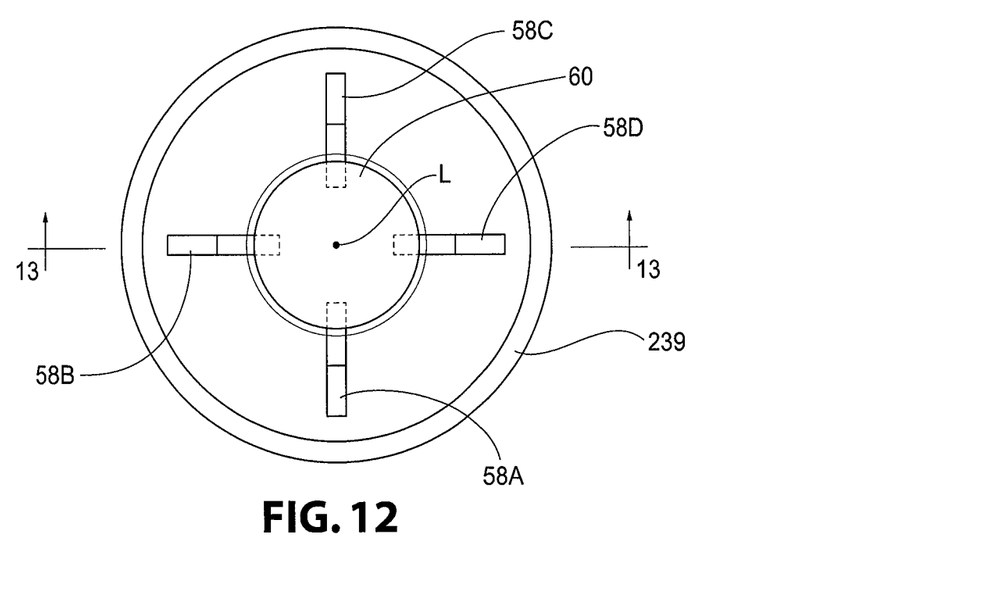
FIGS. 12 and 13 are a top view and a section view along lines 13-13 in FIG. 12, respectively, of an alternative embodiment of the removable section.
Figure 13:
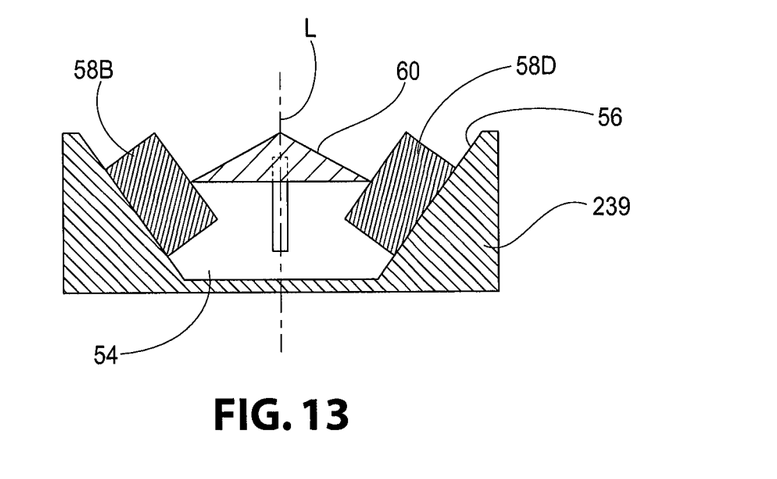

In a further embodiment, the removable portion 239 may have a cavity 54, which may be conical, with a cavity wall 56. One or more baffles 58A-58D may be mounted thereupon in an orientation radially about the longitudinal axis L. Centrally mounted over the baffles 58A-58D may be a cap 60, which may be conical, to direct flow to the baffles 58A-58D. By using a baffle arrangement within the removable portion 239, it is possible collect more particles to further reduce particles remaining in the exhaust gas. While the baffles have been described as mounted in the removable portion 239, it is possible that this portion 239 may not be removable, and the baffle arrangements could still be applied to this bottom portion. Although not shown, it should be appreciated that the removable portion 239 may also have a threaded connection with the remainder of the chamber body.

Figure 14:
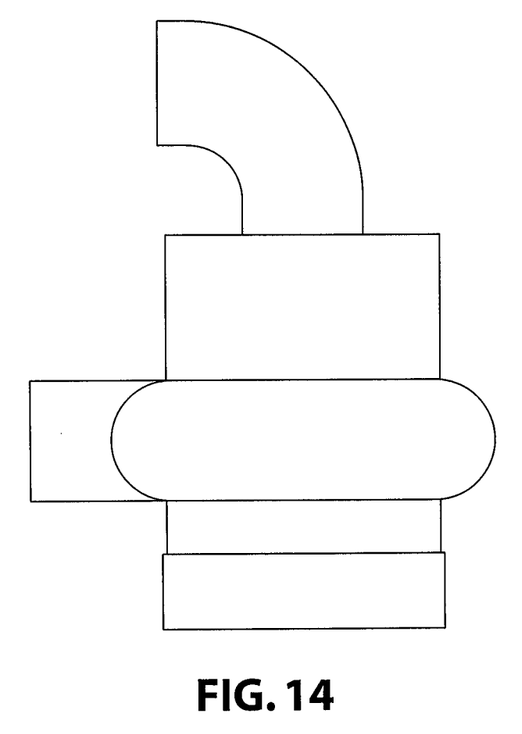
FIGS. 14 and 15 are side and top views, respectively, of the separator.
Figure 15:
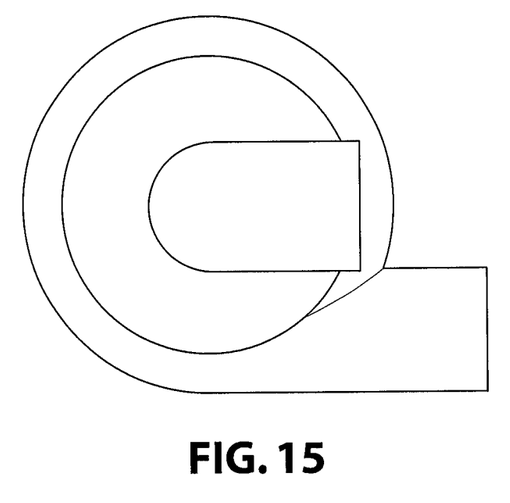

FIGS. 14 and 15 provide additional details of the soot separator.

To minimize corrosion, the soot separator parts may be made from a corrosion and heat resistant material such as stainless steel.

Figure 16:
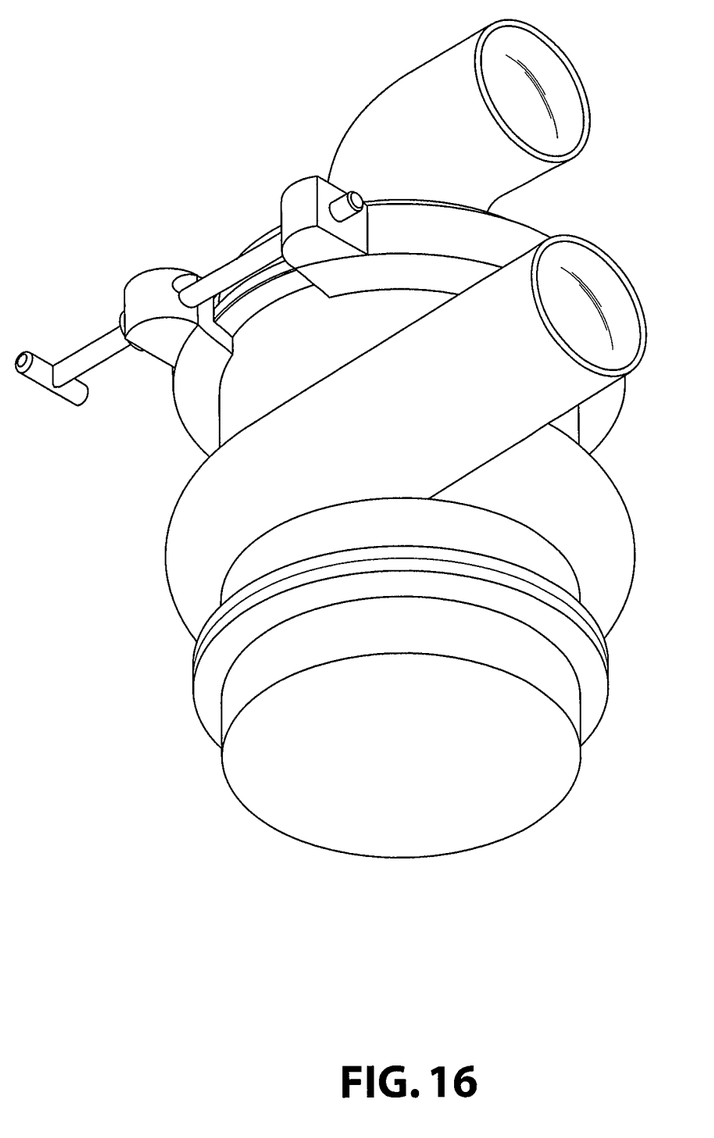
FIG. 16 is a perspective view of the separator showing one manner by which the parts may be held together.

While the different parts of the separator may be welded together, they may also be clamped together, as illustrated in FIG. 16.

Figure 17:
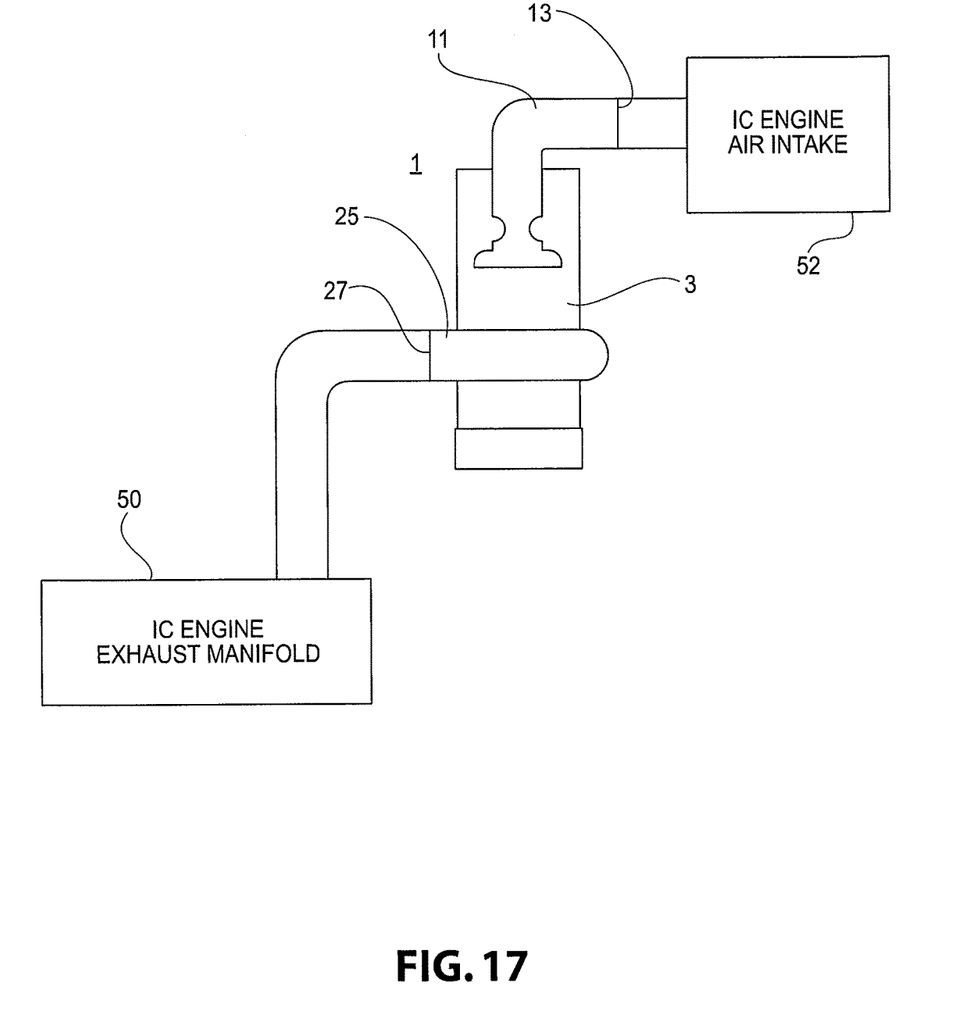
FIG. 17 is a perspective view illustrating how the parts may be secured together.

Directing attention to FIG. 17, in one application of the soot separator, exhaust gas with soot particles from an internal combustion engine exhaust manifold 50 is introduced under pressure to the external inlet 27 of the inlet conduit 25 of the soot separator 1. As described herein, the exhaust gas with soot particles travels through the soot separator and upon removal of soot particles, the cleaner exhaust gas proceeds through the outlet conduit 11 to the external outlet 13 where it is introduced within the air intake 52 of the internal combustion engine.

The soot separator is intended to remove particles from exhaust gas supplied through an exhaust gas recirculation (EGR) system and introduce exhaust gas with significantly fewer particles back to the air intake for processing.

While certain embodiments of the invention are shown in the accompanying figures and described herein above in detail, other embodiments will be apparent to and readily made by those skilled in the art without departing from the scope and spirit of the invention. For example, it is to be understood that this disclosure contemplates that to the extent possible, one or more features of any embodiment can be combined with one or more features of the other embodiment. Accordingly, the foregoing description is intended to be illustrative rather than restrictive.

The invention claimed is:

1. A soot separator comprising:
   an enclosed chamber having:
   a longitudinal axis extending from a top to a bottom of the chamber;
   an upper portion with an outlet conduit having an external outlet;
   a lower portion;
   a toroid portion between the upper portion and the lower portion, wherein the toroid portion has:
   a central opening extending through the toroid portion along the longitudinal axis;
   when viewed in a direction perpendicular to the longitudinal axis, a curved cross section having a gap facing the lower portion;

an inlet conduit having an external inlet extending into the toroid portion; and wherein air with soot particles entering the external inlet travels about the toroid portion such that soot particles are deposited upon an inner toroid portion wall, and the air with the remaining soot particles fully exiting through the gap, continues through the central opening and is discharged at the external outlet.

2. The separator according to claim 1, wherein the curved cross section of the toroid portion is circular.

3. The separator according to claim 1, wherein the curved cross-section of the toroid portion has the shape of ellipse, wherein a major axis of the ellipse is along a line forming an angle F with the longitudinal axis of between 0-90°.

4. The separator according to claim 1, wherein the upper portion is cylindrical.

5. The separator according to claim 1, wherein the lower portion is cylindrical.

6. The separator according to claim 1, wherein the upper portion further includes a discharge conduit extending from the outlet conduit into the chamber, wherein the discharge conduit has a lower end that is sealed and lateral openings extending therethrough between the sealed end and the outlet conduit.

7. The separator according to claim 6, wherein the discharge conduit is sealed with a concave-shaped element, and wherein the concave shape faces the bottom of the chamber.

8. The separator according to claim 1, wherein the flow area through the chamber is always greater or equal to the flow area at the external inlet.

9. The separator according to claim 1, wherein when viewed along the longitudinal axis the toroid portion defines a circle and wherein the inlet conduit has an axis therethrough, and is attached to the toroid portion such that the inlet conduit axis is tangential to the circle.

10. The separator according to claim 1, wherein a portion of the bottom of the chamber is removable.

11. The separator according to claim 10, wherein the removable portion is secured to the remainder of the lower portion through a threaded connection.

12. The separator according to claim 1, wherein the gap at the bottom of the toroid extends along an angle E of 1-30° about the toroid portion cross section.

13. The separator according to claim 12, wherein the angle E is centered about a radial line parallel to the longitudinal axis.

14. The separator according to claim 1, further including a pass-through conduit attached to the toroid portion and extending from the central opening of the toroid portion downward toward the bottom of the chamber.

15. The separator according to claim 12, wherein the removable portion further includes baffles to deflect the exhaust gas/particle flow for greater collection of particles within the removable portion.

16. A method of removing soot particles from an exhaust gas of an internal combustion engine having a soot separator comprised of:
an enclosed chamber having:
a longitudinal axis extending from a top to a bottom of the chamber;
an upper portion with an external outlet;
a lower portion; and
a toroid portion between the upper portion and the lower portion, wherein the toroid portion has:
a central opening extending through the toroid portion along the longitudinal axis;
when viewed in a direction perpendicular to the longitudinal axis, a curved cross section having a gap facing the lower portion; and
an inlet conduit extending into the toroid portions and wherein the method is comprised of the steps of:
introducing the exhaust gas/soot particle mixture into the external inlet of the chamber;
directing the flow of the exhaust gas/soot particle mixture tangentially within the toroid portion such that soot particles are centrifugally deposited against the wall of the toroid portion and the remaining air with the remaining soot particles fully exiting through the gap; and
reducing or ceasing the flow of the exhaust gas/soot particle mixture within the toroid portion such that the soot particles are no longer centrifugally deposited against the wall of the toroid portion and fall through the gap to the bottom of the chamber.

17. The method according to claim 16, wherein the chamber further includes a removable section at the bottom of the chamber and further including the step of removing the removable section and discarding soot that has accumulated therein.

18. The method according to claim 16, wherein the upper portion further includes a discharge conduit extending from the outlet conduit into the chamber, wherein the discharge conduit has a lower end that is sealed with a plate having a concave shape directed toward the bottom of the chamber and further including lateral openings extending therethrough between the sealed end and the outlet conduit, wherein the method further includes the step of directing the exhaust gas/soot particle mixture flow against the sealed end such that additional soot particles are captured and fall to the bottom of the chamber when flow is reduced or ceases.

19. A soot separator assembly for use with an internal combustion engine having an exhaust manifold and an air intake manifold comprised of:
a soot separator having:
an enclosed chamber having:
a longitudinal axis extending from a top to a bottom of the chamber;
an upper portion with an external outlet;
a lower portion; and
a toroid portion between the upper portion and the lower portion, wherein the toroid portion has:
a central opening extending through the toroid portion along the longitudinal axis;
when viewed in a direction perpendicular to the longitudinal axis, a curved cross section having a gap facing the lower portion; and
an inlet conduit extending into the toroid portions;
wherein the external inlet of the chamber is connected to the exhaust manifold of the internal combustion engine and wherein the external outlet of the toroid is connected to the air intake manifold of the internal combustion engine; and
wherein air with soot particles entering the external inlet travels about the toroid portion, such that soot particles are deposited upon an inner toroid portion wall, and the air with the remaining soot particles fully exiting through the gap, continues through the central opening and is discharged at the external outlet.

20. The soot separator assembly according to claim 19, wherein the curved cross section is circular.

* * * * *

UNITED STATES PATENT AND TRADEMARK OFFICE
CERTIFICATE OF CORRECTION

PATENT NO. : 10,436,090 B2
APPLICATION NO. : 15/466652
DATED : October 8, 2019
INVENTOR(S) : John F. Walko, III Page 1 of 1

It is certified that error appears in the above-identified patent and that said Letters Patent is hereby corrected as shown below:

Column 7, Line 4, Claim 1, delete "portion" and insert -- portion, --

Column 8, Line 4, Claim 16, delete "portions" and insert -- portion; --

Column 8, Line 52, Claim 19, delete "portions;" and insert -- portion; --

Signed and Sealed this
Fourteenth Day of January, 2020

Andrei Iancu
*Director of the United States Patent and Trademark Office*